(12) United States Patent
Costaceque-Cecchi-Dimeglio et al.

(10) Patent No.: US 11,348,178 B2
(45) Date of Patent: May 31, 2022

(54) EDUCATIONAL DECISION-MAKING TOOL

(71) Applicant: Rerankable LLC, Cambridge, MA (US)

(72) Inventors: Paola Costaceque-Cecchi-Dimeglio, Cambridge, MA (US); Ijjejan Peter Kamminga, Cambridge, MA (US)

(73) Assignee: RERANKABLE LLC, Cambridge, MA (US)

( * ) Notice: Subject to any disclaimer, the term of this patent is extended or adjusted under 35 U.S.C. 154(b) by 1003 days.

(21) Appl. No.: 14/798,458

(22) Filed: Jul. 13, 2015

(65) Prior Publication Data

US 2016/0012538 A1     Jan. 14, 2016

Related U.S. Application Data

(60) Provisional application No. 62/024,375, filed on Jul. 14, 2014.

(51) Int. Cl.
*G06Q 40/06* (2012.01)
*G06Q 50/20* (2012.01)

(52) U.S. Cl.
CPC .......... *G06Q 40/06* (2013.01); *G06Q 50/20* (2013.01)

(58) Field of Classification Search
CPC ............................ G06Q 40/06; G06Q 50/20
USPC ...................................................... 705/36 R
See application file for complete search history.

(56) References Cited

U.S. PATENT DOCUMENTS

| 8,725,608 | B2 * | 5/2014 | Paulsen-Dziuk | G06Q 40/00 705/35 |
| 2002/0028426 | A1 * | 3/2002 | Pasant | G09B 5/02 434/118 |
| 2002/0045155 | A1 * | 4/2002 | Sugimoto | G09B 5/00 434/362 |
| 2003/0172041 | A1 * | 9/2003 | Dicrosta | G06Q 99/00 705/500 |
| 2004/0110119 | A1 * | 6/2004 | Riconda | G09B 7/02 434/350 |

(Continued)

OTHER PUBLICATIONS

"Cost-Benefit Analysis," by Richard Layard and Stephen Glaister. London School of Economics and Political Science. Cambridge University Press. pp. 1-56. 1994. (Year: 1994).*

(Continued)

*Primary Examiner* — Sara C Hamilton
(74) *Attorney, Agent, or Firm* — Morrison & Foerster LLP

(57) ABSTRACT

Particular embodiments may provide an education decision-making tool. User input comprising profile information and educational goals information for a potential student may be received. A cost-benefit assessment may be computed for each of one or more educational programs based on the profile information and the educational goals information. A return-on-investment (ROI) assessment may be computed for each of the educational programs based on the educational goals information and the cost assessment. In some embodiments, the ROI assessment for one of the educational programs may be further based on historical information (e.g., demographic information and education information) for a plurality of students. One or more of the educational programs may be selected based on the respective ROI assessments. Finally, information regarding the selected educational programs may be sent to a client computing device.

27 Claims, 7 Drawing Sheets

(56) References Cited

U.S. PATENT DOCUMENTS

| | | | |
|---|---|---|---|
| 2004/0133546 A1* | 7/2004 | Oni | G06Q 10/10 |
| 2004/0138913 A1* | 7/2004 | Guerra | G06Q 10/10 705/327 |
| 2004/0167786 A1* | 8/2004 | Grace | G06Q 10/10 705/327 |
| 2005/0095566 A1* | 5/2005 | Price | G06Q 50/205 434/219 |
| 2005/0171820 A1* | 8/2005 | Snyder | G06Q 40/00 705/4 |
| 2005/0214729 A1* | 9/2005 | Greenly | G06Q 10/10 434/307 R |
| 2006/0069576 A1* | 3/2006 | Waldorf | G06Q 10/10 705/7.32 |
| 2006/0265237 A1* | 11/2006 | Martin | G06Q 10/10 705/1.1 |
| 2007/0196794 A1* | 8/2007 | Thornton | G06Q 20/14 434/118 |
| 2010/0131406 A1* | 5/2010 | Deck | G06Q 40/02 705/38 |
| 2010/0145720 A1* | 6/2010 | Reiner | G06Q 50/2057 705/2 |
| 2011/0010306 A1* | 1/2011 | Gonzalez | G06Q 10/10 705/326 |
| 2011/0302159 A1* | 12/2011 | Mikesell | G06F 17/30386 707/723 |
| 2011/0306028 A1* | 12/2011 | Galimore | G06Q 10/063112 434/322 |
| 2012/0130998 A1* | 5/2012 | Varadarajan | G06F 17/30734 707/723 |
| 2013/0018813 A1* | 1/2013 | Carroll | G06Q 50/20 705/327 |
| 2013/0226674 A1* | 8/2013 | Field | G06Q 50/20 705/7.38 |
| 2013/0290072 A1* | 10/2013 | Ren | G06Q 10/0637 705/7.36 |
| 2014/0019375 A1* | 1/2014 | Bailey | G06Q 10/10 705/327 |
| 2014/0052663 A1* | 2/2014 | Kelley | G06Q 30/0282 705/347 |
| 2014/0089219 A1* | 3/2014 | Mathews | G06Q 50/2053 705/327 |
| 2014/0205987 A1* | 7/2014 | Habermehl | G09B 7/02 434/350 |
| 2015/0066559 A1* | 3/2015 | Brouwer | G06Q 50/2053 705/7.21 |

OTHER PUBLICATIONS

"GIS-Based Educational Decision Making System," by Wang Aihua; Xu Guoxiong; Jia Jiyou; and Wen Dongmao. Abstract only. Published: Feb. 8, 2010 (Year: 2010).*

Segal, D., "Is Law School a Losing Game?", The New York Times [online]. Jan. 8, 2011 [retrieved Jul. 9, 2015]. Retrieved from the Internet: <URL: http://www.nytimes.com/2011/01/09/business/09law.html?pagewanted=all>.

Schwartz, B., "The Paradox of Choice—Why More is Less", Executive Book Summary. keithdwalker.ca [online]. Mar. 7, 2014 [retrieved Jul. 30, 2015]. Retrieved from the Internet: <URL: http://keithdwalker.ca/wp-content/summaries/m-p/Paradox%20of%20Choice.Schwartz.EBS.pdf>.

* cited by examiner

EDUCATIONAL DECISION-MAKING TOOL

PRIORITY

This application claims the benefit, under 35 U.S.C. § 119(e), of U.S. Provisional Patent Application No. 62/024,375 filed 14 Jul. 2014, which is incorporated herein by reference.

TECHNICAL FIELD

This disclosure generally relates to tools to aid a user in decision-making.

BACKGROUND

Starting a degree-granting program in higher education is one of the most important and stressful life decisions that a person can make. This is particularly so when it involves moving to another country, which is exciting and full of opportunity but also risky, expensive, time-consuming, and demanding.

Careful preparation, organization, and decision-making are key in order to ensure a smooth transition into and out of the program. The difficulty of this process is easily underestimated and often overwhelming. Directories and rankings of existing educational programs are occasionally misleading because of the way that schools finesse survey information. Furthermore, they are not keyed to a student's particular set of needs and preferences—they codify ranking calculations that are not adaptable to each user, and those formulations inevitably emphasize or ignore factors that individuals would weight differently in their one personal choice-making (Maybe they care less about prestige than a family-friendly environment, for example.)

Currently, applicants may have limited options available in preparing for and organizing this potentially life-changing adventure. Information is scattered and there is an overload of forums, programs, and rankings that does not make navigation easier. As a result, many students discover that they underestimated certain aspects of their program as part of living in another country. They may even find the actual value of the degree they obtained is less than they had expected or even fails to help them move forward along the career path they had in mind.

Schools and various education websites may offer some useful information about existing programs. However, this information is static in the sense that applicants may not be able to customize it to suit their personal search process. The existing sources of information are mostly based on a ranking of schools or programs by agencies using criteria (often surveys) that may or may not have any particular correspondence to the constraints and goals of an individual user. For example, U.S. News & World Report and LLM GUIDE use criteria such as the teacher-student ratio, the hours of courses, and the average graduate's starting salary.

SUMMARY OF PARTICULAR EMBODIMENTS

In particular embodiments, an educational decision-making tool may assist people with the various stages involved in participating in an educational program (especially in a foreign country). As an example and not by way of limitation, a software-based decision-making tool may enable a potential student to (1) analyze information regarding a plurality of factors related to the potential student; (2) find a program that best fits their personal preferences and needs; (3) maximize their experience during their course of study; and/or (4) optimize their "return on investment" once they are getting ready to leave or have left the program.

In particular embodiments, an effective, efficient, unified, and customizable search and decision-making tool may be provided to a user. As an example and not by way of limitation, a decision-making tool may help a user find an educational program that fits their preferences and needs by allowing them to "re-rank" their options according to what matters most to them. This takes into account their unique life situation, their career goals, and personal outlook. In particular embodiments, an educational decision-making tool may provide and organize for users a variety of information associated with selecting and completing an educational program.

DESCRIPTION OF EXAMPLE EMBODIMENTS

Figure 1:
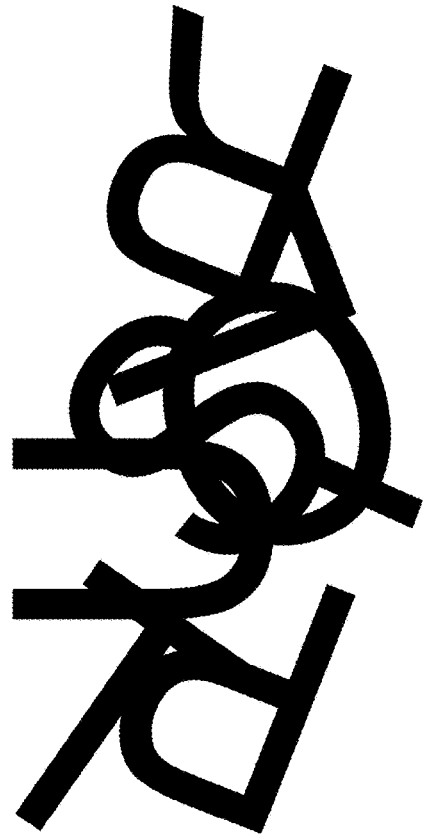
FIG. 1 illustrates an example landing page for an education decision-making tool.

In particular embodiments, particular tools may be provided to help a potential student navigate the different stages involved when participating in a degree- (or certificate-) granting educational program or other educational program defining a course of study in one or more subjects: 1) analyzing information regarding a plurality of factors related to the potential student (e.g., to inform a decision about whether embarking on an educational program would bring the potential student quantifiable benefits, as well as to provide an objective comparison of different programs), 2) searching through candidate programs based on one or more search filters personalized for the user), 3) obtaining resources while going through the program (e.g., to help maximize the student's return on their investment into the program), and 4) assessing post-graduation options to optimize their "return on investment" once they are getting ready to leave or have left the program (e.g., determining what may be the next steps and how to best prepare for that).

In particular embodiments, determining whether a particular educational program is right for an individual student may be based on how well the program fits with the life and the goals of that person. Important factors that determine a student's satisfaction with a program and a living environment might have to do with health, family (e.g., the student, the student's partner, or their children), or community and lifestyle factors. As an example and not by way of limitation, these factors might include: availability and accessibility of nearby hospital care; quality of local public or private schools, including ones geared towards foreign languages; local job market; local community associated with the student's international community or religious community; rural vs. suburban vs. urban settings; or local food options (e.g., fine dining, kosher, vegan, or farmer's markets). Some information may be provided by multiple sources.

In addition, purported benefits provided by the educational program (e.g., tuition rates, survey-based prestige ratings, or average income of recent graduates from the program), may not be weighted in a way that matters most to an individual user. Since there is a lot of available information and no easy way to filter it down, reviewing available sources of information can therefore lead to information overload and decision fatigue. Meanwhile, existing decision tools may not be able to handle larger considerations like what to study, what country and city to study it in, whether to bring loved ones along, how much to budget, or whether to stay or move back after graduation. Together these decisions determine the student experience and the likelihood that it will eventually fulfill a student's expectations and hopes.

During an educational program, educational institutions may provide students with resources about things like social activities, academic announcements, and professional development. However, the extent to which a school provides this kind of support is often not readily apparent to applicants because it is mostly distributed and available "in house." Allowing users to submit, edit, and review some of this information may allow other potential applicants to search out the level and quality of support and guidance the school provides, as well as potentially capture and share some of their own hard-earned knowledge with other students in attendance. The same applies to those who are exiting or have exited the program.

FIG. 1 illustrates an example landing page 100 for an education decision-making tool. In particular embodiments, an educational decision-making tool may refer to a website, web service, or client-side software application that assists a user in selecting an educational program. In particular embodiments, an educational decision-making tool may be referred to as an online decision tool, a decision tool, a decision-tool website, a decision-assistance tool, a tool, an online educational decision tool, an educational decision tool, or a decision-making tool.

In particular embodiments, users may replace general one-size-fits-all criteria with their own preferred criteria to determine what is best for them before, during, and after they attend an educational program. Without necessarily affecting what the tool presents to others, a user may be able to re-rank the programs by filtering and weighting any of a number of diverse factors that range from directly related to education (e.g., tuition rate) to those less directly related (e.g., how bikeable the host town is). In particular embodiments, "re-ranking" may refer to a process where a user dynamically refines or re-refines their search, causing different results to be highlighted in their web browser, software, application, or any other interactive medium (connected to the Internet or not). They may further refine, save, and share their search results. The educational decision-making tool described herein may help users in their decision-making process by providing guidance in identifying the program that best fits their needs before they have started participating in a program (e.g., when they are in a "Before" stage).

In particular embodiments, an educational decision-making tool described herein may offer an online system that assists the user in careful decision-making and navigating vast amounts of information. The goal is to help the user develop a decision strategy that leads to an education choice and experience that fits his or her personal needs and preferences. As an example and not by way of limitation, the tool may help prospective students with navigating the educational program landscape, which includes thousands of options. Additionally, it may help with identifying and managing the array of decisions that come with embarking on a study abroad. It offers a step-by step approach that assists users in making informed tailored choices (e.g., the "decision-making assistant"). It provides relevant information and in a timely manner (e.g., the right information at the right time by organizing information in stages: before, during and after). The tool helps users assign weight to the options and factors that influence their decision in order to filter, sort, highlight, or save their options.

An audience for an educational decision-making tool described herein may include prospective students, current students, or alumni of higher education from any age group in any country. In different contexts, the term "higher education" may refer to high school (or equivalent) degree programs, certification programs, associate or bachelor's degree programs, or graduate degree programs (e.g., L.L.M., M.B.A., J.D., M.D., M.A., Ph.D., M.C.P., D.D.S.), joint-degree programs, and the like. It may be funded or not, with or without any scholarship, and alone or with families, for months or several years, with any intention to stay or return, during a beginning, middle, or denouement of a career. The educational decision-making tool described herein may also be used by educational institutions that want to advertise their programs to potential students who fit a certain profile. The audience may also include educational institutions that want to advise their students on next steps to take, foreign programs, employers that want to help their employees develop, or career agencies that want to provide advice to their clients.

In particular embodiments, an educational decision-making tool described herein may assist future and current students to optimize their decision-making process, help them sift through and make sense of the flow of information, present them with information that specifically considers their unique circumstances, or help them optimize their experience and achieve their goals (e.g., finding an optimal match between a program and a potential student). Particular embodiments may provide the user the ability to think through their options or provide them with sorting and filtering mechanisms for his search based on both present predetermined factors, as well as new filters created by the user to filter their search.

In particular embodiments, an educational decision-making tool may tailor results to the information and decision-making preferences of each individual. It may allow the user maximum flexibility in what information is provided or how and when information is presented. It may offer information relevant to the specific user in an easy to read fashion (for instance, providing a "dashboard", which a user may customize.) It may present recent user activity (either in general or specific to individual users or groups of users). It may save and present search histories, including both inputs and outputs, as well marking progress through decision-making steps. It may give the user the ability to create a personal search profile and keep track of his search and application process on a dashboard and gives suggestions along the way.

In particular embodiments, an educational decision-making tool may offer various features to users, such as for example, a decision assistance tool, a search tool, an information tool, or a checklist and alert tool. Such features may help users in managing their higher education process in the broadest possible sense, ranging from providing information about the exact programs offered, to all aspects of the living environment that determine the quality of life, as well as suggestions about what others with similar profiles or personal goals did or found useful.

In particular embodiments, a decision-assistance tool may give users the ability to clearly identify their needs (or the needs of their loved ones), prioritize what they value the most, and based on this information allow them to create a personal ranking of the programs that best meet their interests.

In particular embodiments, a search tool may allow the user to combine and compare information about programs. It lets them add information through different filters, allowing users to get sense of fit (e.g., how well a certain program may fit his or her life-situation or particular future goals). The choices of the different search filters may be based on various criteria and factors which may include some unique or non-traditional criteria or factors. Some might be generated through user input and deployed for all users or for specific users. Users could share their experiences and search results with others in order to learn from their experiences and further refine their decision-making processes.

In particular embodiments, an information tool may provide users with information they indicate as relevant for them. It includes updates from schools and news or changes at the school that may influence how people think about the programs.

In particular embodiments, a check or alert system may remind users of important deadlines or provide them with useful checklists.

The user may navigate the various stages of the tool using a wizard, which offers users advice depending on where they are in the process: before, during, or at or near completion of an educational program.

The information from different third-party sources may include but are not limited to statistical information from departments of motor vehicles (DMVs), banks, public records, hospitals, or local recreational sites. It may for instance also include information from YELP or other websites that use customer reviews to grade a service or facility. If a magazine ranks cities based on which are the best for runners, or the safest, or the most environmentally sustainable, those third-party sources might be integrated into the website and transformed into filters users may use. The website may include an interface to collect additional information from other websites such as GOOGLE MAPS (mapping application) to provide information about location and distance to schools or other destinations the user is looking to use.

In particular embodiments, users themselves may choose or tailor the relevant filters and combine them with public information made available on the school's or program's website. For example, a user may select variables related to programs directly such as costs, location, ranking published, scholarships available directly to the programs, programs specialization, deadlines; such factors may be combined by adding filters related to non-school factors such as crime rates in the area, number of kinds of banks available, or distance to the nearest consulate or hospital. It is a non-limitative list of factors that users may add to or subtract from dynamically without necessarily affecting what other users see.

In particular embodiments, the schools may also have the opportunity to match and complete information provided to the user and update what is publicly known about the school. The user interested may opt to receive this additional information on a regular basis (e.g., by email or on his profile or some other kind of notification they consent to). Information provided by schools might impact the ranking of the schools, such as when additional programs are added or are deleted, or extra scholarships have become available.

In particular embodiments, the user may choose how to format the search results. This may be visualized in various ways, such as graphically, in diagram form, or in words. He may also opt for subdividing or presenting results in specific categories, such as by state, price, or duration. The website may provide for a database consisting of a) specific information about programs or b) public information available through third-party sources that are not directly linked to the program but may be of interest to the user as it provides valuable information about the "quality of life" based on the users profile. The user may also be able to select a printer friendly version of his search results and may make hard copies of searches, search criteria, or trace his decision steps in the decision tree.

In particular embodiments, a user may opt to import his contacts, such as from LINKEDIN or FACEBOOK, so that their contacts' relevant information can be integrated into the search process (specific to that user). For example, this might help users visualize or analyze information their contacts provide about where they go to school. This gives the user for instance information whether someone in their existing FACEBOOK or LINKEDIN network has already attended a specific school or program, providing another piece of information and reference that may help in the decision-making process. To create an account or use the website, it may not be necessary to import contacts.

In addition, users may post comments and relevant information about their experiences to allow other user to evaluate the compatibility of the program with their specific needs and wishes, and provide input on their experiences with how programs perform based on the conventional and non-conventional criteria.

In particular embodiments, besides getting recommendations based on information the user submits or provides himself, or predetermined criteria, or custom-made criteria, users may also receive additional suggestions about searches or results. For instance, the user may see "People who looked at this profile also looked at." The website may also suggest other programs that others with similar profiles found suitable.

In particular embodiments, trending searches may be displayed in real-time or updated regularly. Users may save, adopt, or integrate these into their search tool.

In particular embodiments, a search field may allow users to input search values.

In particular embodiments, between searches information may be automatically generated and pushed out to different users that indicate in their profile they are interested in the type of information. For instance, information that may influence the ranking of a school, such as updates on new programs at schools, increased or decreased criminal activity in an area, changes in housing opportunities, certain types of job openings, or closing or opening of specific type of schools, sport, or leisure opportunities.

In particular embodiments, a user may have the opportunity to add various search criteria and also weight them in order of preference. This may be done for any of the search criteria—both traditional and nontraditional. For instance, a particular user might assign scholarships high importance, availability of campus-housing might be assigned "average" importance, and distance of campus to city center as having a "low" importance. Or, a user might weight the cost of living, nearby crime rate, hospitals with kidney dialysis machines as of very high importance, and proximate hiking opportunities "average," and supermarkets within a mile as "low". The weighted criteria may combine to determine the personal ranking of the school, the program, or the living environment. This disclosure contemplates weighted searching regardless of substance, not just related to higher education.

In particular embodiments, a website may present information to a user in an animated or non-animated way, depending on the section. The search tool may be animated. Items "weighted" more would be featured visually through position, size, color, shape, order, or other visual indicia In particular embodiments, as users type into the search field, the tool may attempt to auto-complete their search based on recent or frequent searches. Additionally, recent search terms, or sets of filters and search terms, might be displayed prominently and dynamically in a way that responds to a user's behavior. This would model functions on other websites such as "Users looked at this item you're looking at now also looked at this other item you haven't looked at."

In particular embodiments, based on a user's behavior, certain "tips" from other users might be appended to the information that accompanies each program in their search results. For instance, if users have searched for international schools in the neighborhood, the extra suggestion may exist in tips that the school has also scores high on excellent child care facilities nearby.

In particular embodiments, users may design their own "dashboard"—which may include, for example, news about certain programs they have designated; deadlines pertaining to programs or other applications or activities they have marked; saved searches or rankings; checklists; or moving tips (e.g., depending on where the users are in the process).

In particular embodiments, apart from a search tool, an educational decision-making tool may provide an online decision-making tool using a decision tree methodology. It may help the user in the different phases of his search to make up his mind, figure out whether doing a program makes sense, identifying, discovering, or refining his particular needs, by structuring his process of decision-making. It may work like a "choose your own adventure" story, where the users are prompted for inputs and then shown outputs based on those inputs.

In particular embodiments, the decision tree may help the user to 1) identify, 2) refine, or 3) prioritize his specific needs in order to make an "informed choice" based on information relevant to him. It may walk them through different pieces of information that are either published and public information offered by schools and programs themselves, or by a third-party server providing information on these programs and are combined with non-educational factors to optimize the decision-making process of the user.

In particular embodiments, the user may navigate to the website to obtain "decision-making tips or advice" through the decision tree model. Information is presented based on the programs the user selects (e.g., pre-L.L.M., pre-M.B.A., pre-J.D., pre-M.A., pre-Ph.D., pre-M.C.P., information available during L.L.M., M.B.A., J.D., M.A., Ph.D., M.C.P., or post-L.L.M., post-M.B.A., post-J.D., post-M.A., post-Ph.D., post-M.C.P.).

In particular embodiments, the decision-making tool may simplify or give guidance in the potential life changing experience of traveling across the world with or without family and embarking upon several months to years of studying and living. It helps juggle the cultural, financial, language and relational challenges in order to make this an optimal experience that leads to the result wished for.

In particular embodiments, a user may skip any step, take a short-cut to specific answers, search randomly, or get more refined advice on specific aspects.

In particular embodiments, the decision tool may be used separately or together with the search tool. Both are meant to serve users with different search methods—either intuitively or very structured depending on the decision-making preferences of the user (e.g., very random, instinctively, or organized step-by-step decision-making).

The decision tree may function in several manners. It guides users and helps them find information about schools and programs and information relevant for the quality of life. At each "branch," the user may choose between several options, providing access to features and information about the different stages in the process of decision-making about embarking upon a program abroad. The decision tree is divided into information and choices especially relevant "Before" the user applies to programs, 2) "During" the attendance of the program, and 3) "After" the user finished the programs at the chosen school, when users start or continue work careers.

In particular embodiments, the decision tree may have information provided by schools about their programs, information imported into the website from third parties as deemed relevant for the user population as a whole, information tailored to the user's input, or input from other users.

Other functions may allow third parties to access this information, contents, or advertisement to other parties, from the information that is collected through the website. For instance, the user could get specific offers (e.g., to find a place in the neighborhood he is interested in). There are several opportunities for advertising on the website. It may be general advertising related to what users come to the website for in the first place, being educational programs. Advertisers may be schools that want to promote their program, such as law schools advertising their L.L.M. programs. Another form is advertising tailored to the specific user—targeted advertising based on user-submitted content. The website may provide automatic display of advertising content based upon the user searches. This may be a specific educational program meeting the search criteria, but also student loan providers or job websites. These may be general or very local advertisers.

In the education industry, especially in the graduate institutions environment, many higher education schools or programs (e.g., law school or business school) have websites that include information for specific degrees or programs (such as L.L.M., M.B.A., J.D., M.A., Ph.D., M.C.P.). However, what current websites lack is a systemic approach providing users with tailor made advice, the ability to collect information, and help them to make a choice between the hundreds of programs, that best fit their needs considering their financial, career, relational situation and factors they find important and determine their quality of life. A user (e.g., potential candidate, current candidate, or alumni) may navigate to a school's website (e.g., using a computer and a conventional web browser or using a tablet, smart phone, or other device) and obtain information about the school. Such an approach may be adequate for those who know exactly which programs they want to apply to and are familiar with what can be expected when applying to the particular programs and living in the area, assuming they have no particular needs, no limited budgets, or have any specific wishes or needs with regard to living environment.

Some existing education websites provide a ranking and some background on schools and their programs, as do some of the schools on their own websites. While ranking may be the decisive factor, it is not tailored. The best match between program and candidate may depend on many other factors than the ranking of programs. Some websites provide for some interaction and opportunity to post remarks or questions. However, most websites may not provide information available that potential candidate current candidate or alumni may need in further organizing themselves before they decide to attend an program, when they are attending the program, or after they attend the program. In fact, the user may not currently obtain competitive information without having to visit multiple third-party websites and manually comparing the information available for each program. Furthermore, even if a user does spend the time searching across multiple websites to obtain various information about the programs itself or about all requirements or things he needs to think of before moving to a foreign country, users are still limited in comparing the programs according to their own individual criteria and factors that are of importance for them in the short and long term both professionally and personally.

This discovery helps candidates ask themselves the right questions, get the level of information they are feeling most happy with and allow them to prepare for their stay, allowing them to get as much out of the experience as they can. Considering the investment and impact on one's life that go with moving to another country, being far away from ones family and friends, investing months or years of one's life, taking an unpaid leave, or quitting a job, or even applying for a program as a first step in starting a new career and or life in a different country. Even if the user is considering a program of mostly-online education and accreditation, their decision about which program to choose could still represent a paradigm shift in their life. This website allows the user to consider an abundance of factors important to deciding, planning, and enjoying an educational program. That implies considering the characteristics of schools and programs and timing of the application process, the stay and the return to one's home country (if traveling), but also factors not directly related to the educational program that have everything to do with organizing a life that is different or elsewhere. These are important factors that may nevertheless influence an applicants' choice when comparing programs.

In particular embodiments, a decision-tool website may serve the need for an online search tool wherein users may obtain information and guidance on the choice of programs before, during, and after enrollment.

The World Wide Web (WWW) is the multimedia information retrieval system. In the web environment, the Hypertext Transfer Protocol (HTTP), which is a known application protocol providing user access to files (e.g., texts, graphics, images, sound, or video), allows client machines to effect transactions to web serves using a standard page description language known as Hypertext Markup Language (HTML). HTML offers basic document formatting and allows the developer to identify "links" to other servers and files. Nowadays in the Internet environment, a so-called Uniform Resource Locator (URL) identifies the common use of a network path to a server. The URL has a unique and special syntax for defining a network connection. Use of an HTML-compatible browser (e.g., Safari, Firefox, Chrome, or Internet Explorer) at a client machine requires specification of a link via the URL. In response, the client makes a request to the server identified in the link and, in return, receives a document or other object formatted according to HTML. A collection of documents supported on a web server is sometimes referred to as a web site (or, website or web page). One of the technological advantages of the WWW is the simplicity with which information may be posted and retrieved by user. Any worldwide computer user may navigate to a website of interest and obtain relevant information hosted by the website.

Using a progressive enhancement, landing page 100 and the other pages may allow the user visiting the website specialized in educational programs to find information they are looking for. The user may browse information on the home page or follow links to the interfaces for "Before" (FIG. 2: 200), "During" (FIG. 4: 400), and "after" (FIG. 5: 500) depending on whether they start the educational program, are already enrolled or are near the end of the program. Alternatively, they may choose the search option to do a school search applying one or more search filters (e.g., FIG. 1: 2, 3, 4, 5). Other options on the landing page are to follow the current main discussions (e.g., FIG. 1: 6) or access the Search School database (e.g., FIG. 1: 7). Under each hyperlink a breadcrumbs system may appear near the top of a given web page or below a link. It may show the user the pages and subpages that appear before the page the user is on (e.g., FIG. 1: 2, 3, 4, 5, 6, 7, 10, 11, 12).

The user may opt to go directly to the school page of their interest or the user may choose to let the website help them in navigating to programs that fit their specific needs, using a step-by-step method that helps the user to build a search profile tailored to his specific needs and his specific living situation. Either provides information on any educational programs or schools that fit the specific search criteria of their profile or in the field they are specifically looking at without having created an elaborate profile.

Figure 2:
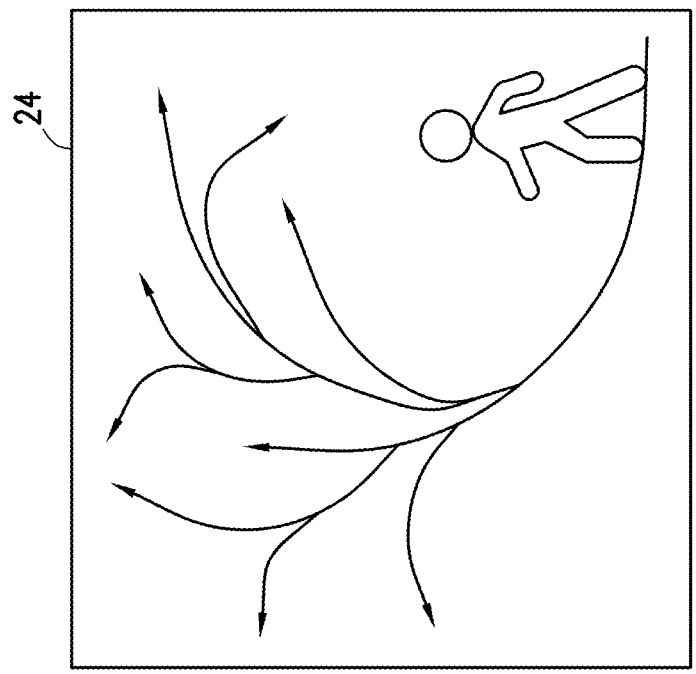
FIG. 2 illustrates an example "Before" interface displaying information for a person selecting an educational program.
Figure 2:
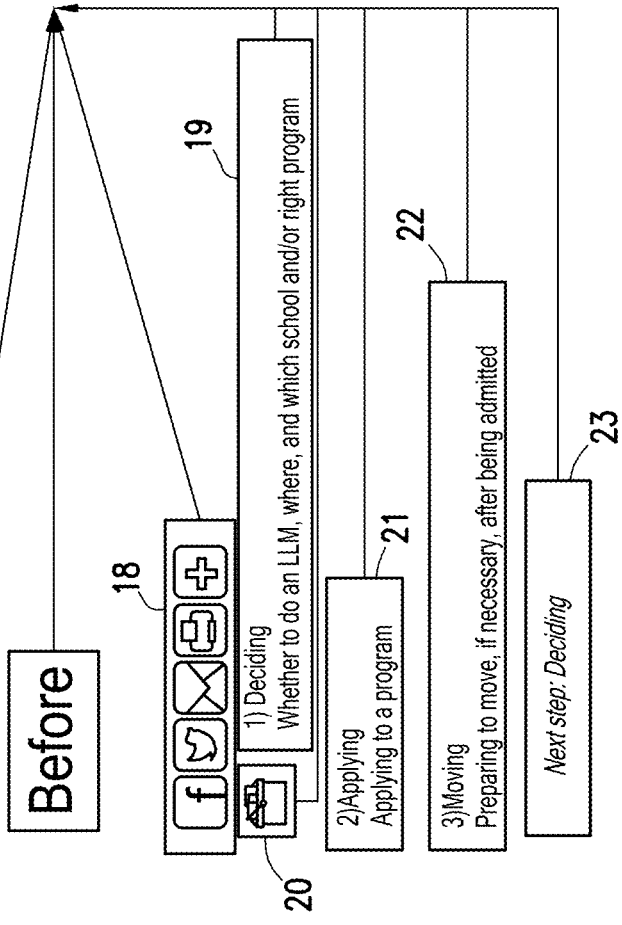
Figure 3:
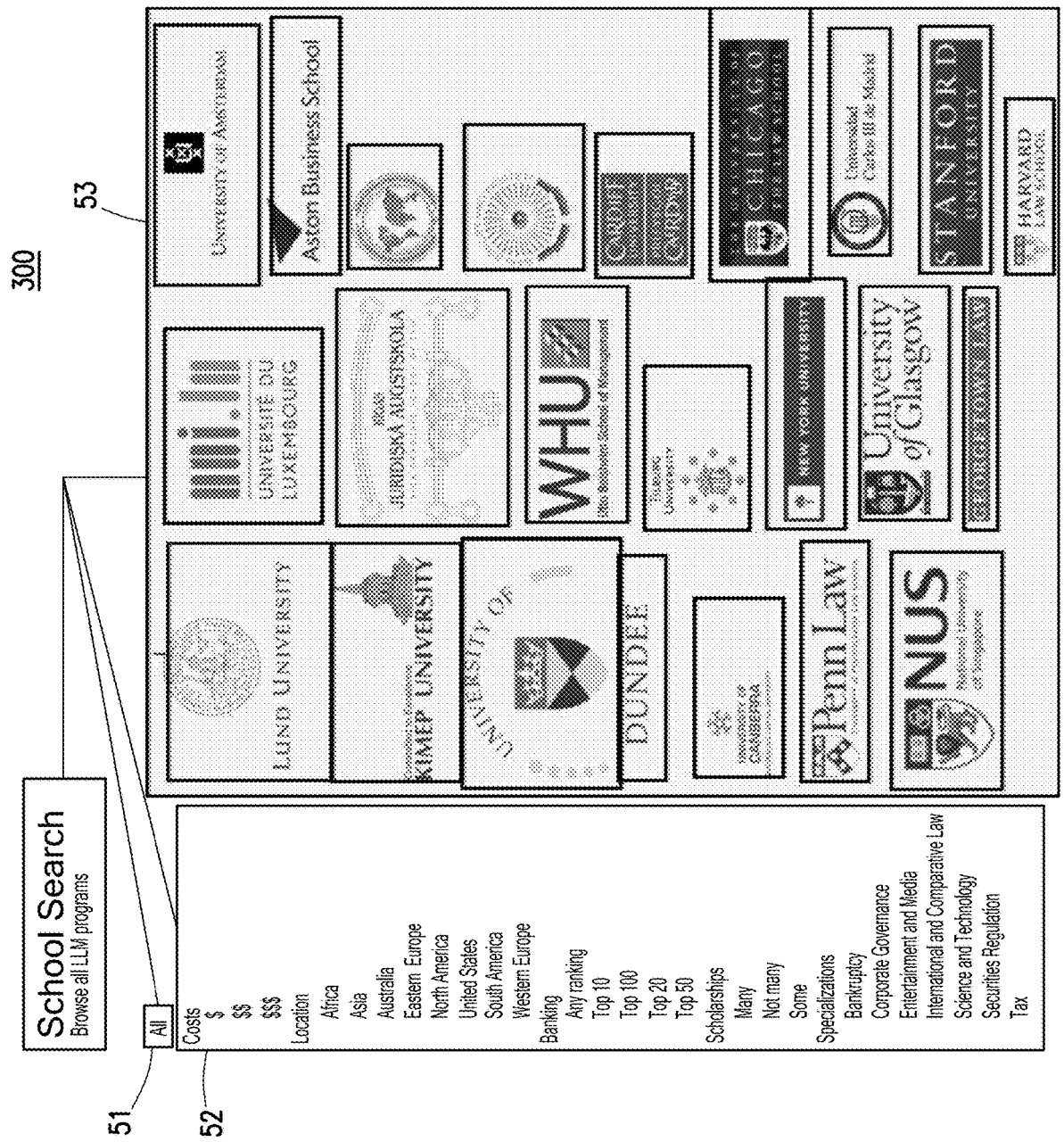
FIG. 3 illustrates an example interface for performing a search for an educational program.
Figure 4:
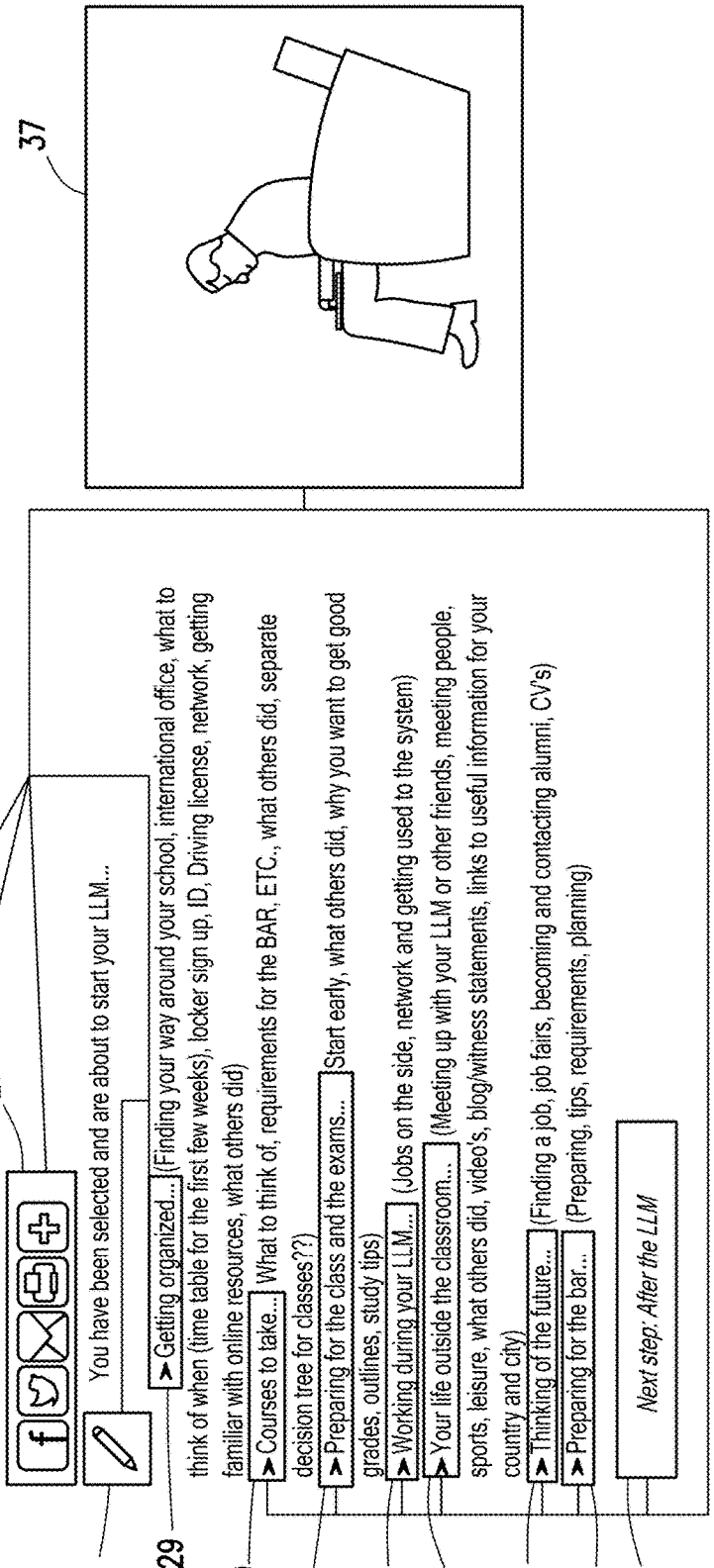
FIG. 4 illustrates an example "During" interface displaying information for a person enrolled in an educational program.

In particular embodiments, animated pictures, graphs, or text of a set of inspirational words, popular search terms, or advertisement may be displayed on focal points of the landing page (e.g., FIG. 1: 8, 9). Each display may simulate movement played in series in the landing page. A search bar on every page may allow users to search the website. The users may be given the option to easily post or share some of that content with various social networks or social media, or print, email, or bookmark the content (e.g., FIG. 1: 14; FIG. 2: 18; FIG. 3: 27; FIG. 4: 40).

In particular embodiments, the user may have the option to subscribe to updates from the website. The user may choose to do so on the basis of certain selections they make about what kind of content they would like updates about, including but not limited to: new items in the database that match particular combinations of search filters, or simply any new elements entered on the website by the administrator or other user (e.g., FIG. 1: 14). The user may have the option, through the use of key words (e.g., FIG. 1: 13), to search into the website page or content marks with the similar key words. Some items in search results may be featured at the discretion of the website administrators (e.g., FIG. 1: 15).

FIG. 2 illustrates an example "Before" interface displaying information for a person selecting an educational program or school. A user may choose a hyperlink about information relevant before they choose educational programs or the schools. A user may be given the option to easily post or share some of that content with various social networks or social media, or print, email, or bookmark the content (e.g., FIG. 2: 18). Under the hyperlink to "DECIDING" (e.g., FIG. 2: 19, 23), the user may have the option to choose from different hyperlinks or to click under more information available under this hyperlink. A menu of related hyperlinks may appear to direct the user to information available to help decide (e.g., FIG. 2: 19, 20), to apply (e.g., FIG. 2: 21), or to move to the new education program (e.g., FIG. 2: 22).

In particular embodiments, the user may have the option to choose between different hyperlinks allowing them to find general and public information about what is the goal of a particular educational program, what the work experience of similar graduates is, the average cost, if attending this educational program is immediately relevant to given careers, the main application requirements, and other important choice-making factors. For instance, the user may click or mouse over to see profiles—through video, audio, or text—of a graduate of this educational program. The user may also have the ability to compare and weigh specialized and non-specialized educational programs, as well as, full-time and part-time degrees. A visualization—e.g., a balance scale or shopping basket—may be displayed on the side of the page, where the user may add and compare various factors (e.g., FIG. 2: 24).

In particular embodiments, the user may click over hyperlinks helping him to decide whether it is something for them. The user may have the option to develop their user profile by responding to a set of questions, inspirational figures, or keys words by which they identify. This feature may further help them to respond to three main questions: (1) whether the education program is for them, (2) where they should go, and (3) which school seems the most appropriate. For instance, the questions might help elucidate whether they are pursuing accreditation, adventure, a new career, travel, or other. If the user plans for a legal career in a new country, for example, a relevant flowchart would appear, which would include both tightly and loosely related options, like transfer, working for foreign department etc. The users may also find information that he did not think of, or were simply not aware of. For instance, a married student choosing to attend and graduate from a program may not be aware that their spouse may be able to accompany the student during their study year abroad and have the ability to work under a certain type of visa. The initial funding required to attend the programs abroad may increase but the budget should be adjusted to the potential earnings during the academic year of the spouse.

In particular embodiments, the choice of inspirational persons, inspirational figures, or keys words limited to several options may allow an identification of values such as honor, excellence, innovation, to match and suggest appropriate schools or programs looking for candidates having the same values, or recognizing these unique combination in their students or alumni.

In particular embodiments, the user may also develop his user profile by answering questions about several factors or criteria of importance for them. For instance, a user currently in a relationship and who has school-age children may select the profile-field or search filter of "family-friendly." They might also browse by the average cost or rating of private or public schools in the area.

In particular embodiments, the user may select and weight important search factors. For example, if the user is looking for a Socratic teaching method, instead of a traditional lecturing method, the user may choose this option and decide to weight it as impact 4 (or "very high"). Consequently, programs that claim to use a Socratic teaching method may be selected and presented to the candidate, while programs with other lecturing methods may be eliminated from their search. Nevertheless, a presentation of skills-earning exercises and advice may be suggested if the user does not know the difference between them, giving the option to be referred to discussion on the website or exterior web-pages that are relevant for this discussion.

In particular embodiments, using a matching system, a decision tool may present targeted advertising content, responding to filters or perhaps a specific combination of filters chosen by the user. In particular embodiments, a decision tool may also show a flow chart that visualizes the decisions the user is making or has made (e.g., FIG. 2: 24). In particular embodiments, a decision-tool website may suggest personalities or values prized by that particular educational program.

In particular embodiments, the user may have the option to identify a list of people connected to their network (e.g., social, professional, or per country of origin) that may have attended the particular or similar program.

In particular embodiments, the tool may display a flowchart illustrating recommended action steps that are more likely to lead to the professional and personal aspirations in the short, medium, and long term in accordance with their current positions.

In particular embodiments, the user may have an option to use a financial planning tool. It may help the user to establish their current financial situation and the steps they should take to obtain sufficient funding for attending the educational programs or schools of their choice. For instance, the user may choose between options like "Money is not an issue," "I have between $50,000-$100,000 available through private funding or scholarship," "I still need to make arrangements but I am confident I will have the money," or "I don't have that kind of money." Different financial actions plan may be presented accordingly based on the user input. If the user chose "I don't have that kind of money" (or something similar), the website would list sources of funding, work, savings, financial assistance, scholarships, and loans available with regard of their individual background. If the user did not define their profile, a general list may be offered.

If the user opts, she may also have the option to determine, through the use of a financial tool feature, the average of income and average debt for people in the profession they aspire to practice. This feature may be crossing this data with the average income and the average debt of the graduate from this program, and how long it should take them to pay back the loan/or money borrowed. Furthermore, the data may be cross-referenced with current student loan averages, and what percentages various banks offer with the user's country of origin or (if different) within the school/host country. On the other hand, the user may choose to obtain a list of scholarships or website where appropriate funding are available for them to support or help the payment of the program or schools they choose to attend.

Finally, the user may have been provided with animated text on how school rankings are taken into account. A graph may appear with the different source of ranking and may be comparing to each other. An illustrative example of a school may be used to show a same school according to the different criterion used and may be re-ranked differently. Finally, the server may provide helps function by demonstrating the tool that the user may re-rank as he wants if he is adding criterion that are of importance for him.

The "APPLYING" (e.g., FIG. 2: 21) may bring the user to a page offering an overview of the toolkit for the best strategy to apply for programs. A table of contents may be at the top of the page and under it the user may have the opportunity to jump forward or back in the application process as it is described on the website.

The user may have a choice to click under "HOW TO APPLY" and "WHEN TO APPLY". If the user previously filled out his profile under DECIDE, the information provided under this hyperlink may be reorganized, taking into account the most relevant information and the major steps for his choice. Providing him tailored suggestions adapted to his personal profile. If the user did not fill out this part of his profile, he may be arriving on the general page presenting the information as follows.

In particular embodiments, the user may see a suggested timeline to organize and gather all the documents required. If the user mouses over the general checklist, the main requirements for the educational program and a timeline charts on the side of the screen may appear. Every time the user clicks or mouses over an element of the checklist or steps recommended, that part may be enlarged and simultaneously have the option to access the school database at any time along this search or cross reference it with the search they may do later. The user at any time may save their search. In this case, the timeline or steps recommended may adapt to the user input based on the schools they are applying to.

At this stage, the user may have the opportunity to choose between a pre-program or a flex-program for acquiring all the various document and steps recommended on the checklist. If he chooses the pre-program, the user may have the option through mouse over to see an animated timeline presenting the different documents or steps that they may have to take along the process. For instance, if the user needs to write a personal statement and a CV for a specific programs the timeline/checklist may incorporate recommended dates for completing various stages of the writing process like brainstorming, outlining, drafting, rewriting, getting feedback, etc. It may incorporate information from throughout the website (e.g., including information provided by third parties like schools). Similarly, the user may connect their search and visualize similar discussion on social media.

If the user opts for the flex-program, they may have the option to re-prioritize these tasks by order of importance, difficulty, timing, deadlines, or patience required.

In particular embodiments, the user may cross the requirements with the schools they will have selected to create an adapted time line showing all the document requirements and application steps for the schools they have selected. In this timeline, the user may have the option to synchronize with his electronic calendar. If there is an event in the calendar that is already marked, the checklist and time line may be readjusting taking into account this information. Moreover, the user may be able to see if they desire to synchronize it with school news or career fairs around the world. The user may have the option to synchronize and add to the calendar notifications about whether alumni of a school are coming for a public engagement in the country, region, city, the user is currently in. These notifications might provide suggested conversation starters, too.

In particular embodiments, particular embodiments described herein may be applied to multiple schools at once through a "MULTIPLE APPLICATIONs" option. It is anticipated that most users who are applying to schools may apply to more than one school during an application cycle, and the features described above would work for multiple schools at once, integrating, for example, deadlines from different schools into one timeline, checklist, calendar, or notification system.

In particular embodiments, the user may have the option to click on a different hyperlink to see "PAST EXPERIENCE PROFILE". The user has the option to either get information organized by topics or by format of their choice. The user may click on video, blogs, testimonies, journals and newspapers articles, TV show or radio shows either mentioning the specific school or the specific programs. The user may have the option to redefine the information they are looking for by choosing different topics. The opportunity to click on the format or topics available may allow them to have the information provided according to their own need.

This part of the website may present choices to be made related to moving to where the educational program is taking place. First, it allows users to find information about the required paperwork, including things needed to be able to move to the foreign country. Animated charts may show different kinds and amounts of information such as type of visa available, health insurance available or required for the specific country. In this context, a checklist may show each user general and tailored tasks and to-do items when arriving in a new country, such as opening a bank account, obtaining a social security number, or buying a car. If the user chooses a specific place in the world to attend a school or a program, the user may choose to see public information such as banks, DMV office, and the social security or disability office in the neighborhood of the school where they plan to attend.

Second, an important part of moving is finding a place to live. The user may use a hyperlink on this "Moving" page to provide them help in deciding on housing such as location, kind, price, as well as identifying the appropriate online forum for finding a place to live. For instance, the user may be provided with a search option for housing in the neighborhood of the university, or in area of their interest. The user may be able to compare and cross-reference areas by criteria that may affect their decision on housing such as safety, cultural activities, entertainment, presence of sports, times of commute to and from the school or other location of the educational program, public school, supermarket, liquor store, post-office, utilities, or internet service available. The user may also be provided with an interactive platform allowing him to be informed about events in the neighborhood or city where they will be located. The user may have the option to click on profiles of people leaving in the neighbor and socially connect with people with similar backgrounds, maybe even attending the same school. For instance, users may be able to see the number of people in their neighbor attending the same school (e.g., according to publicly available information or information provided to the website by its users). The combination of this different element may allow the user to rank neighborhoods according to factors of importance for them. After deciding which neighborhood they desire to live in, the user may have the option to create a practical list of information or tasks, which they may download or synchronize with their calendar. Two options may be possible: a suggested step by step process for moving, or an independent process for settling as fast as possible in this neighborhood (e.g., useful for those who move at the last minute before a program starts).

Third, budgetary restrictions may be a factor in choosing the exact location. Therefore the next hyperlink provides a calculation and expectation tool to determine financial abilities of the user/future student. To allow students to choose where to live they may get a sense of the cost of living. The tool allows for a comparison of estimated monthly living costs at their home country/city and abroad where they plan to attend the schools or programs. It involves an interactive map or chart that may compare between current costs of living, including some particular to the program location. For instance, the user may have a map of where they are and where they are going, allowing for a quick calculation of the expected costs of living (e.g., rent, food, leisure) in their home town and the location near where courses for the program will take place. They may be able to add other costs from a list like furniture, airline tickets, local transport, or family. This tool may also incorporate data from third-party providers (e.g., a magazine or website) and allow for some input or voting by other users. This feature may allow the user to see what they can afford considering their budget adapted for the period of their educational program. Furthermore, the user may have the option to see the current percentage of employment in the neighborhood (e.g., city, state, or country) and cross-reference this information with the employment rate of alumni in this school or program—either present in the neighborhood, or in the state and compare it with the national level of employment.

A fourth hyperlink provides access to information regarding practical choices on what to bring to the location of the program, settling into a house and how to get around. For instance, suppose the user wishes to have information on how to decorate their new place of living and move the main furniture into it within a certain budget. The website may provide them with a map of the different furniture and appliance stores or second-hand stores available around their location. It could also link to or incorporate listings of moving companies in the area. Or, if the user is in city X and they are looking for a particular kind of item (like a couch) under $500 USD, the user could use this tool to see all the specific furniture stores advertising or selling one that fit that description. Similarly, the user may see a list of blogs or marketplace websites specific to that area (e.g., city, neighborhood, or country). For instance, if the user were moving to Boston, they may see a link to CRAIGSLIST generally and another link for CRAIGSLIST's Boston-area website, divided by links for sellers and buyers, acquainting users with the relevant online marketplaces and providing either a portal to that marketplace or incorporating its content into this website.

FIG. 3 illustrates an example interface 300 for performing a school search. In particular embodiments, in the program search tool, a user may use existing, suggested, or self-made filters. This way the user may evaluate each program taking into account factors related to the program and others factors not related to education but relevant for the quality of life of the individual. Thus he may rank and re-rank the programs according to various criteria. The user may filter and select programs according to infinite possibilities of combination of factors that may affect its choice. The user may assign a weight to the separate search factors to further refine his search results and the ranking between them. In other words, users have the option to weight certain criteria more than others when filtering or sorting the database. Rather than just narrowing the search results by layering filters that either exclude or include results (which may still be an option), a weighted search would output results based on how important different search criteria are marked by the user.

In particular embodiments, a user may directly go to each section independently, and switch between them, while saving the search results at any time and having the opportunity to compare saved search results amongst each other. In other words, each search may generate a unique URL that remains valid and may be shared or revisited.

In particular embodiments, filters used in searches may be based upon publicly available information, which may be compared to, and in some cases combined with, the information users provide about their preferences. Schools may provide information directly related to programs. The information may include not solely the information about characteristics of their programs, like duration and price and deadlines, but may also provide information that make them stand out in other ways considered important for the attractiveness of a program (such as social aspects of campus life, communities, facilities for students' partners and children, or immigration issues). The universities may be able to submit this information directly to the database for review by a webmaster. Other information may be imported from different third-party sources that are independent and indirectly sourced from the educational program, but tell potential students about whether life within the program may fit with their needs and interests. Examples include information extracted from third-party sources such as DMVs (e.g., how long it may take to get a driver's license or a local ID to apply for a social security card), banks (often times a local bank account is needed to pay for funding as international transfers may be costly), public records, hospitals, etc.

An educational decision-making tool described herein is an online search and decision-making system that allows users to find and use various information and selection criteria that they may want to consider during the different phases of their search for educational programs. Its main goal is to help students prepare and assist themselves and each other in making the best of their educational program. The educational decision-making tool provides the user with tools that help them find a program optimally tailored to each individual user's wishes and needs. The user may use it to help define their choice and determine the programs that best fit their needs and aspirations. It offers the ability to the user to rank and re-rank the programs in accordance with criteria and factors that they have personally selected or created or have been suggested to them. The user may access information on a worldwide scale (information is available per country, state).

In particular embodiments, information about programs may be available in an easily searchable database. The users (e.g., potential candidates, current candidates, or alumni) may access information about programs, and the facilities and activities in the area. They may also access information that is not directly tied to the education program but is relevant to evaluate the competitive advantages of each program and how well each program fits the users personal needs. The user chooses the criteria that he finds the most important to consider when applying for or attending the program, and then gets the option to indefinitely make, re-make, tweak, or tailor their own ranking of higher education programs. This allows users to prioritize the options according to the criteria they most value. In the search option, the user may also be able to weigh the criteria based on whether they are more or less important for him. According to a user's search criteria and his weighting of them, programs may be recommended, which may enhance a user's decisions.

In particular embodiments, each user may create an account, which may allow him or her to create a unique search or interest profile. Along with the process of searching for programs, the user may be able to clearly define and refine his individual needs, thus creating a specific search profile. He may do this by responding to a set of questions that helps to identify the programs that would best fit the personal needs and preferences. This is like a "saved search," or set of "saved searches." In particular embodiments, a list of questions to establish a search profile may consist of questions directly related to the programs (such as locational preferences, costs range, or available courses), but may also include questions that allow the user to provide more general information that is indirectly relevant to the choice of programs. For instance, it gives them the ability to provide some information about the user's career goals or their inspirational figures. Doing so allows the search engine to give tailor-made suggestions for programs based on the user-provided information, combined with information from third-party sources. It may also provide rankings for areas or even kinds of housing that best seem to fit the user's needs.

In particular embodiments, additional suggestions (e.g., suggested searches and search results) may be based on: information from other people with similar career goals; choices made by people that are currently working at the employers that a user indicates he wants to work for; or the choices attended by user-defined leaders or inspirational figureheads. The tool may collect the information users provide and save it to create a dynamic and evolving personal and unique profile. The user may also have the option of assigning a weight to the different factors—either by ranking it on a scale (e.g., relevant, important, essential) or by taking a quick questionnaire.

In particular embodiments, there may be an option to integrate elements from the decision tree into the search profile or integrate elements of the search profile into the decision tree. For example, the decision tree may generate search strings or filters and might be integrated into the profile.

In particular embodiments, the tool may present, highlight, rank, or feature higher education programs in the database according to how well they fit the search profile, and how high they score based on the weight appointed to the criteria (if any). The tool might also suggest searches or search-results based on profile information.

In particular embodiments, a user may have the option to save his search information and continue or refine his search at a later time. The user may save his profile and his search results anonymously or he may choose to share their profile or search results with other users.

In particular embodiments, the tool may facilitate information-sharing between users and crowdsourcing of information. As an example, it may allow users to share searches and re-rankings with each other, and combine that with information provided by the educational program and by third-party sources. As a result, the user may have the opportunity to compare each program with any of a number of the filters, search strings, sorting options. That way, users create their own personal ranking of programs according to their own needs and save those customized search results.

In particular embodiments, when searching for information from third-party sources, the website may reach out to a third-party system, potentially including that information for any program in the database of the website. For instance, if a third-party source has already provided information about hospitals with kidney dialysis machines near schools in a particular area, users may be able to request or implement this filter. Search results that show up may indicate how far the school is from it and may then ask the user to attach a weight to this criterion.

After choosing which type of information a user is looking for (e.g., within the categories "Before", "During," "After" or "School Search"), the navigation system may allow users to navigate through a database using standard, suggested, or custom filters. Multiple filters may be applied simultaneously. They may be related to the program but might also concern aspects that have more to do with the living conditions/factors that influence the quality of life that are not necessarily directly linked to the education. There is the option to redisplay the search results through variations in filters and there are options to highlight particular items.

In particular embodiments, search filters that have been applied by the user may be noted as such through graphical distinction, such as their display in a separate area near the search results and the complete list of filters. The filters may be added or subtracted by way of tick-boxes, drop-down menus, sliders (e.g., as in cost), conditional logic forms, or other graphical elements with which the visitor may interact. For instance a person may filter and select data on criminal acts, public and private school available, disabilities access, security access, average living cost in the neighbor, to compare the different educational programs or schools. The user also has the option to create filters of his or her choice. An indication of the number of items that fall within a specific category or tag may be displayed within the menu, perhaps as a parenthetical number after the text of such a filter, so as to hint to the user how many items would be returned by such a search. These preview numbers could adjust dynamically based on how filters are combined. The different filters may help the user to refine his profile and weight the factors of its choice to have a functional and adapted display of the educational program available in his field.

In particular embodiments, the items/results returned by any search, including especially the results of a search passed through multiple filters, may be redisplayed according to one of several dimensions, including but not limited to factors like census agency, popularity, alphabetical or reverse alphabetical order, cost, ranking (e.g., according to some internal or external sequence), or even a random re-ordering of the results. A user may have the option to highlight particular items in the database (e.g., in the spirit of "favorites" or "save for later"). Items marked in this way may be distinguished graphically from the others in the database or retrievable later by the user without having to re-enter the same search query.

When viewing informational detail for a specific search result, the tool may display similar or related items, as determined by what previous other users viewed or "favorited" before or after the current selection, the same or similar set of filters (be they categories or tags) that this item is included in, or just what has been popular among other visitors, as measured in different increments (e.g., this day, this week, this month, this year).

The user may be able to display or hide collapsible content through clicking, mousing over of off, or otherwise selecting, distinguishing, or interacting with content. The effect may be like an accordion unfolding to reveal more than what was previously displayed.

The application of a filter or filters to the database may cause the URL of the website to change, such that anyone pasting that same URL into a web browser would see search results of the same combination of filters (even if not in the same order) as was originally used to create the URL.

In particular online embodiments, "below the fold," the user may navigate through each page of the website with the option of an infinite scroll. Infinite scroll is a plugin for JQUERY, WORDPRESS, and other software that prefetches content from subsequent webpages and appends that content to the current page. The effect is that when a website visitor scrolls to what appears to be the bottom of a page, more content loads at the bottom and the user may scroll down to see it without browsing to a new page. It may be deployed where searches return so many results as to increase page-load times beyond what is judged to be optimal by the website administrators. The user might be able to toggle this feature too. It would be accompanied by a floating option to return to the top of the page.

The user may filter a database of schools by applying multiple filters simultaneously (e.g., FIG. 3: 51, 52). The user may re-sort and re-filter the search results (e.g., FIG. 3: 53), with the option to highlight particular results.

This contrasts with simply running a search by applying one filter to the database, and then perhaps running a new separate search based on a different filter. Users may select filters based on pre-set information or predetermined factors, but they may also view factors that they say should be taken into account, look at recent or popular searches (e.g., based in part on what people with similar profiles searched for), and add these new search criteria. The tool may pull information from several different third-party sources, including the DMV, banks, public records, etc. to create the filters that the user judges to be important. The user may filter and select schools according to infinitely many filtering and sorting options. The user may have the ability to re-rank the schools or programs in accordance with criterions and factors that they have personally selected, and are of importance for them or have been suggested.

The user may anonymously re-rank the filters or allow other users to see how they re-ranked school with similar filters. The filters may be added or subtracted by way of tick-boxes, drop-down menus, sliders (as in cost), conditional logic forms, or other graphical elements with which the visitor may interact. For instance, he may select filters directly linked to the school or program he is interested in, such as criminal law, Ivy League school, or scholarships. Users may combine these with various other factors that they find important for determining a specific program, such estimated costs of living, weather, percentage of crime in the area, public and private school available for children, disabilities access, or hospitals access with dialysis center. A user may apply one, two, five, ten, or any suitable number of factors or filters. The user may also see what other users have found important as criteria and select it to use in their own searches. On the side of his search, the user may see blog posts and experience-based information according to the school and criteria he may select.

When a user mouses or hovers over a search result, a small preview of the details of that result may appear without the user having to click. There would be an analog for mouseless platforms (like touchscreens). Users may select multiple previews at once, and drag items to be next to each other so that they may compare them within the search tool.

If the number of search results exceeds a certain number, only as many results up to that number may be displayed, but when the user scrolls to the bottom of the search results, more may be presented. In other words, this tool may integrate "Infinite scrolling."

Users may have the option to customize the displaying such as school names, or alongside/instead of images or other icons, if they want to (for example) affect the load times on the search. Users may mark certain items in the search results as "favorites." Users may be able to view what other users marked as favorites. When users make or modify a search through tags, categories, or any kind of filter, a URL specific to that combined search may be generated. This hashtag history may allow users to return the same search results by just entering the same URL again, rather than having to manually re-select all the same filters. The search results may be re-sorted in any number of ways: random re-shuffling (like a deck of cards), alphabetical, by cost or distance, or by what's recommended (e.g., based on what users with similar profiles "favorited").

FIG. 4 illustrates an example "During" interface displaying information for a person enrolled in an educational program. In particular embodiments, an educational decision-making tool may help users optimize their time during the educational program and may guide them in steps to maximize the value of the program for themselves personally. It does so by allowing users to create a profile and browse or receive organized information relevant for their individual needs. It gives answers, points out helpful information and shows what others did during and after their course of study. Here again, some schools have robust offices of career counseling or peer programs, but it is usually available sometimes only in-house and not always integrated or sortable in the way a student or potential applicant might like in order to use it well or determine if the school is right for them.

Under "During" hyperlink (e.g., FIG. 4: 25, 26), the user could get information related to different tabs such as the organization and school (e.g., FIG. 4: 29, 30, 31, 32), practical tools for getting by on/off campus, leisure or getaway options, connect with people, personal development and future steps (e.g., FIG. 4: 33, 34, 35, 36). Under each of the specific hyperlinks, the user could access different information and animated charts (e.g., FIG. 4: 37).

Under organization and school, the user may select the school they are attending. If the user is not selecting a specific class, the tool may provide different strategies and resources to select classes. For instance, a short overview of topics and the potential career paths would be associated with specific classes or types of classes. The tool may recommend specific courses based on the interests they defined in their profile (or select with this tool) or on tests they plan to take (like a bar exam). If the user select a specific school, they may have the option to see the different classes offered and the ranking of the professor for each of class they may select (e.g., either as provided on third-party websites or as reported by website users). They may have the option to see what other user having a similar profile as theirs have said about the class and the professor.

Another feature may provide access to outline data banks and flashcard databases available for the course they have chosen. Other users may upload outlines or flashcard sets or link to where they are posted elsewhere. Users could vote/rate these resources and comment on them or even edit them in a way that is visible to others (e.g., in the same way a wiki is jointly edited and improved by a community).

In particular embodiments, the user may see a social survival kit feature. It may contain information such as how to best do research, how to study, how to borrow books, how to navigate within the campus, how to be connected to students groups in general or with specific interests. The user may have the opportunity, according to where he is near the campus or on the campus, to be connected directly with people that have research those question or raise similar interest on the web. If other users want to upload their locational GPS-based data to meet up, they might have that option. The user may have the option to send a message to others saying, for example, "Hi there, I want to be introduced to you since we share the same interest on a specific topic or area." The user may have the option to pre-select or to define himself the area-topic they seem to have in common. The user may receive a list of tips to optimize his school year and be aware of all the activities the school may propose or offer.

After selecting his classes and credit hours, the user may develop a plan for balancing work and pleasure. The user may have the option to establish a schedule matching the best their objectives on work-life balance.

In particular embodiments, a finance tool may provide information about getting a job on or off campus, opening bank accounts, starting credit cards, and saving money. The user could be connected to job offers on the campus or outside the campus. The connection for job outside campus may be based on the school network, his own network, and through third-party websites. The user may sign up to receive alerts—in weekly or daily digest form, or instantaneous—about job listings matching their profile or their aspiration. The user may have the option to find job listings via different filters representing several criteria such as time, salary, place where the job take place.

Under banks, the user may see a display of the banks available near the campus. The user may have the option to filter the bank information according to several criteria such as checking accounts with the best interest rate or lowest minimum amounts, savings account options, or minimum calendar days the account may remain open. The user may be connected to information or discussion on other platforms where customers indicate satisfaction of the banks. The user may click to see if people on his network have made comments or discuss on public forum about this specific bank. They may also launch a discussion thread to ask advice, which could also send or alert people in his social networks, other users on the website, or others, asking for advice. The user may use the same process for credit-cards. They may also have a list of information available about credit card system and have the option to compare credit cards from the various providers according to features they can select, such as lowest rate, payment in 12 months without APP, etc.

The user could also see methods for saving money. The user may receive practical tips to save money from other users, or link to articles from third-party websites. The user may have the option to select a specific category in which to receive deals. For instance, they are looking for the cheapest seller of eggs in the neighborhood, they might opt to receive deals (like coupons, specials, and discounts) for food, either as individuals or as a group of various sizes.

Under getting around, the user could see the public transportation options, rental companies (including car, bicycle, or scooter), hourly rental car rates, car sellers, or carpool options. The user may filter the information's according to his needs and make a comparison of what is the most interesting to them.

The user may be presented with options between cell phone providers available in the area. They have the option to compare them through the use of filters reflecting their needs in number of texts, minutes, data, or other factors. The user could be connected to other people in the same schools or programs who might want to start a group phone plan in order to save money.

The user may have the option to see: association or groups sharing their interests; activity in the region, city and school activities available around them; or day or weekend trips available around where they are. The user may have the option to filter the trip search according to a range of budget or activities. For example, the user could filter to find activities in his neighborhood for less than a specific amount The user may have the option to see a list of local newspapers (e.g., free or paid). The user could see what other users did or recommend doing for fun in the area. These could be text or videos.

Under future steps, the user may see a list of things that they may want to prepare or collect in order to find a job soon. First, the user could be directed to the database of alumni of the specific schools they attend. Second, they might see tips about what they should think of before applying for a job. The user could see job fairs in or near their schools, city, state. The user has the opportunity to see who in their various networks have been employed by specific organizations. If a user wants to be introduced to someone known to someone in their network, the user could send a request through this tool or a social network asking to be introduced.

The user could compare companies and re-rank them according to the different filters they apply such as salaries, diversity, retirement packages, holidays, family friendly. The user could link to publicly available profiles of employers' staffs and see if there is a match with the user's background.

If at the end of the year, the user needs to take an examination in order to be allowed to practice a discipline in the country (such as a bar exam after attending law school), the user may have the opportunity to see what are the best programs to prepare this exam and a list of tips on choosing one and passing that exam.

Figure 5:
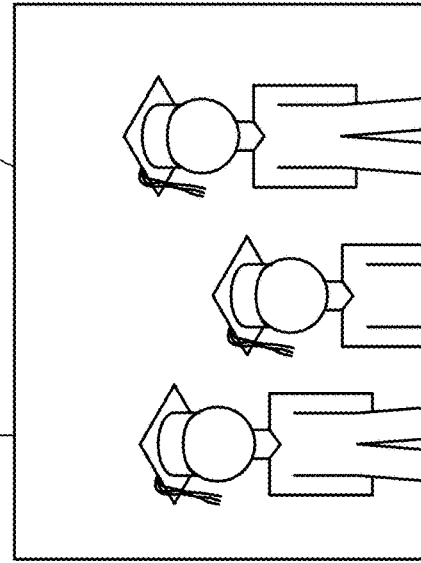
FIG. 5 illustrates an example "After" interface displaying information for a person after completing an educational program.

FIG. 5 illustrates an example "After" interface displaying information for a person after completing an educational program (e.g., FIG. 4: 38, 39). In particular embodiments, a decision tool may include information to help a user decide whether to go back to their home country or stay in a host country. The user may have the opportunity to see several options according to where they decide to go: either 1) stay in the host country/city/state where they studied, or 2) go back to their previous home (e.g., FIG. 4: 42, 43). The different information may be pulled out of different third-party sources.

If the user decides to choose option one, a number of different options may appear. First, they may opt to see recommendations on job searches or available internships (e.g., FIG. 4: 45, 46, 47). The user may have the option to choose different filters that may help them to redefine their search and present to them the most valuable information. For instance, the user may search according to the area they wish to live or salary they are looking for. The tool may provide information on employers and organizations that are interested in people whose profiles match the user's. For instance, if an L.L.M. student is looking to find a job in the US, the tool may present her with a list of law firms in the U.S. (or a region she selected) that are interested in hiring L.L.M. alumni.

The user may have the option to search firms by alumni background. The user may also see available job fairs, where employers are looking for people with profiles like theirs (e.g., FIG. 4: 46). The user may be able to get information about the fairs, such as which organization participate, how to register, how best prepare their CV, and what sort of "elevator pitch" is appropriate.

In particular embodiments, a decision tool may propose alternative solutions for the user, like either further continuing his or her education through subsequent degrees, or trying to pass an exam to be licensed in the state where they wish to establish themselves (e.g., FIG. 4: 44, 48). The tool may present information about the process, application, tradeoffs, and several paths possible, according to the result of such an exam. The user may take a self-diagnostic quiz to help them decide what to do. The tool may also raise potential considerations for each path that are specific to many L.L.M.s, including, for instance, information about visa and extension of visa. Some of these considerations may be drawn from third-party sources, such as U.S. government agencies regulating the work of foreign students and foreign applicants.

If the user decides to choose option two (going back to their previous home), the tool may allow them to filter a list of alumni from the same or similar schools. This may allow them to see the profiles of other users who were previously students (some at the same school) that went back to their home country. Different third-party sources may be used to provide information to optimize the return to the home country. The user, for instance, may be able to find information about what other people in the same situation have been doing, and where they are currently (e.g., professionally) in their country. They may also be able to find practical information on how to leave—e.g., closing bank accounts, sorting out social security, paying taxes, and so on.

Figure 6:
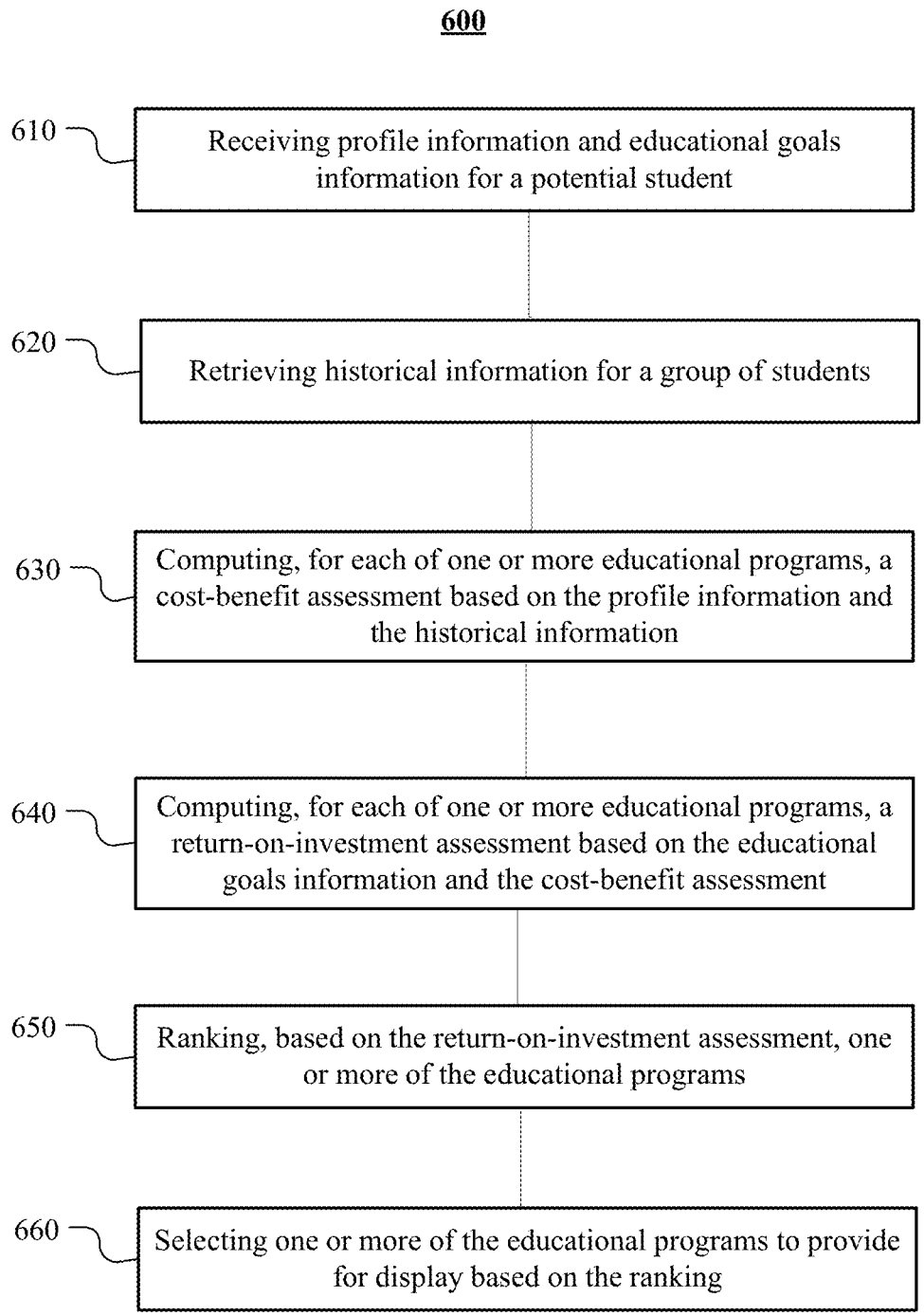
FIG. 6 illustrates an example method for providing an education decision-making tool.

FIG. 6 illustrates an example method 600 for providing an education decision-making tool. At step 610, particular embodiments may receive profile information and educational goals information for a potential student. The profile information may include any of the profile information described above, as well as:

current degree(s) earned/anticipated w/GPA(s);
current location and willingness to relocate;
current cost of living (with respect to average) and willingness/ability to adjust;
current salary/earning power, including projections, during the period of the educational program (assuming must attend full-time) (may consider spousal income, parental support);
acceptable cost of education; and/or
personal requirements (e.g., must be within x miles of hospital with certain facilities, church of certain denomination, gym with certain facilities, within population with threshold number of eligible single people).

The educational goals information may include any of the profile information described above, including: quantitative goals (e.g., to make $XX or set minimum threshold of X % above average income for a given area) or qualitative goals (e.g., given X # people in household, and major life goals), such as sending three kids to college and purchasing a new car every 7 years, setting % threshold for ratio of job stability to potential income).

At step 620, particular embodiments may retrieve historical information for a group of students. At step 630, particular embodiments may compute, for each of one or more educational programs, a cost-benefit assessment based on the profile information and the historical information. At step 640, particular embodiments may compute, for one or more of the educational programs, a return-on-investment assessment based on the educational goals information and the cost-benefit assessment. At step 650, particular embodiments may rank, based on the return-on-investment assessment, one or more of the educational programs. At step 660, particular embodiments may select one or more of the educational programs to provide for display based on the ranking.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for providing an education decision-making tool including the particular steps of the method of FIG. 6, this disclosure contemplates any suitable method for providing an education decision-making tool including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
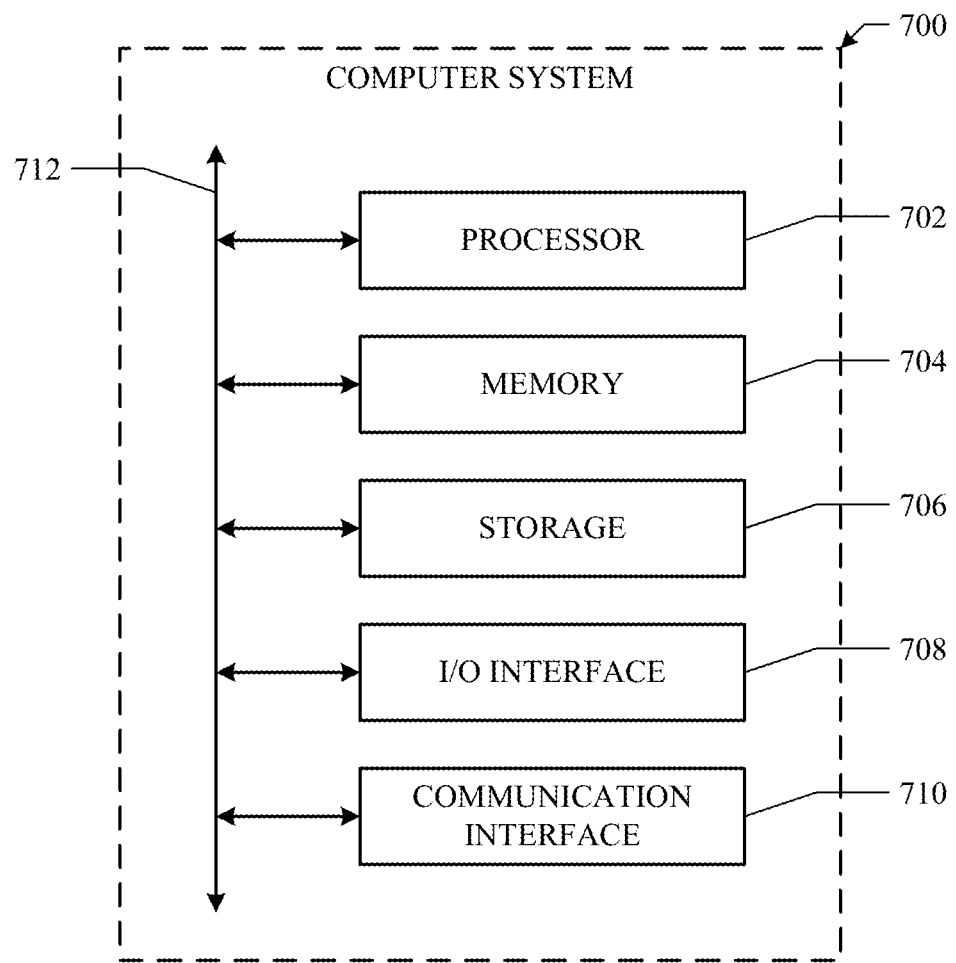
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for providing an education decision-making tool, comprising:

determining, by one or more processors of a computer server, a first user input inputted via a user interface serviced by the computer server and executing on a client computing device coupled to the computer server via a communications network, the first user input corresponding to an input of profile information, one or more preference factors, and educational goals information for a potential student;

computing, by the one or more processors, for each of a plurality of educational programs, a cost-benefit assessment for the user based on the profile information and the educational goals information;

computing, by the one or more processors, for each of the plurality of educational programs, a return-on-investment (ROI) assessment for the user based on the educational goals information, the one or more preference factors weighted based on a corresponding weight for each of the one or more preference factors, and the cost-benefit assessment;

selecting, by the one or more processors, a set of one or more educational programs of the plurality of educational programs based on the respective ROI assessments;

causing, by the one or more processors, the user interface executing on the client computing device to display a first information set including first information corresponding to the selected set of one or more educational programs;

determining, by the one or more processors, a second user input inputted via the user interface executing on the client computing device, the second user input comprising an input to modify at least one of the corresponding weights that the one or more preference factors is weighted based on;

re-computing, by the one or more processors, the ROI assessments for the user for each of the plurality of educational programs based on the educational goals information, the one or more preference factors weighted based on at least one modified weight for each of the one or more preference factors, and the cost-benefit assessment;

selecting, by the one or more processors, a different set of one or more educational programs of the plurality of educational programs based on the respective re-computed ROI assessments; and in response to determining a user interaction with one or more interactive elements displayed within the user interface and corresponding to the one or more educational programs:

causing, by the one or more processors, the user interface executing on the client computing device to display a second information set regarding the different set of one or more educational programs, wherein the second information set comprises detailed information about the one or more educational programs of the different set of one or more educational programs, wherein the detailed information is included in the second information set based on the second user input, and wherein causing the user interface executing on the client computing device to display the second information set comprises dynamically updating the user interface to display second information corresponding to the different set of one or more educational programs visually more prominently than the displayed first information corresponding to the selected set of one or more educational programs.

2. The method of claim 1, further comprising:
accessing, by the one or more processors, a database comprising historical information for a plurality of students, the historical information comprising demographic information and education information, wherein the ROI assessment for one of the plurality of educational programs is further based on the historical information.

3. The method of claim 1, further comprising:
requesting, by the one or more processors, from a plurality of users of the education decision-making tool, demographic information and education information, wherein the ROI assessment for one of the plurality of educational programs is further based on the demographic information and the education information.

4. The method of claim 1, wherein the first user input corresponding to the input of profile information and the educational goals information for the potential student is based on a personalized set of information associated with a unique identifier for the potential student.

5. The method of claim 1, wherein the selecting the set of one or more educational programs further comprises:
ranking, by the one or more processors, the plurality of educational programs based on the respective ROI assessments.

6. The method of claim 1, wherein an ROI assessment is computed for each of a plurality of potential students, the method further comprising:
generating, by the one or more processors, a ranked list of the plurality of potential students based on their respective ROI assessments; and
providing, by the one or more processors, the ranked list to the client computing device.

7. The method of claim 1, wherein the second user input is determined based on a user interaction with the one or more interactive elements.

8. The method of claim 1, wherein, prior to determining the second user input, the corresponding weights for each of the one or more preference factors are based on general criteria; and
after determining the second user input, the corresponding weights for each of the one or more preference factors are based on criteria customized for a user of the education decision-making tool.

9. The method of claim 1, wherein, in response to determining the user interaction with the one or more interactive elements displayed within the user interface, the method further comprises:
generating, by the one or more processors, a shareable resource uniquely representative of the second information set; and causing, by the one or more processors, the user interface executing on the client computing device to display the second information set and the shareable resource concurrently.

10. A system, comprising:
a computer server communicatively connected with a client computing device via a communications network, wherein the computer server comprises:
one or more processors; and
one or more computer-readable non-transitory storage media in communication with the one or more processors and comprising instructions that, when executed by the one or more processors, cause the computer server to:
determine a first user input inputted via a user interface serviced by the computer server and executing on the client computing device, the first user input corresponding to an input of profile information, one or more preference factors, and educational goals information for a potential student;
compute, for each of a plurality of educational programs, a cost-benefit assessment for the user based on the profile information and the educational goals information;
compute, for each of the plurality of educational programs, a return-on-investment (ROI) assessment for the user based on the educational goals information, the one or more preference factors weighted based on a corresponding weight for each of the one or more preference factors, and the cost-benefit assessment;
select a set of one or more educational programs of the plurality of educational programs based on the respective ROI assessments;
cause the user interface executing on the client computing device to display a first information set including first information corresponding to the selected set of one or more educational programs;
determine a second user input inputted via the user interface executing on the client computing device, the second user input comprising an input to modify at least one of the corresponding weights that the one or more preference factors is weighted based on;
re-compute the ROI assessments for the user for each of the plurality of educational programs based on the educational goals information, the one or more preference factors weighted based on at least one modified weight for each of the one or more preference factors, and the cost-benefit assessment;
select a different set of one or more educational programs of the plurality of educational programs based on the respective re-computed ROI assessments; and
in response to determining a user interaction with one or more interactive elements displayed within the user interface and corresponding to the one or more educational programs:
cause the user interface executing on the client computing device to display a second information set regarding the different set of one or more educational programs, wherein the second information set comprises detailed information about the one or more educational programs of the different set of one or more educational programs, wherein the detailed information is included in the second information set based on the second user input, and wherein causing the user interface executing on the client computing device to display the second information set comprises dynamically updating the user interface to display second information corresponding to the different set of one or more educational programs visually more prominently than the displayed first information corresponding to the selected set of one or more educational programs.

11. The system of claim 10, wherein the one or more computer-readable non-transitory storage media further comprise instructions that, when executed by the one or more processors, further cause the computer server to:
access a database comprising historical information for a plurality of students, the historical information comprising demographic information and education information, wherein the ROI assessment for one of the plurality of educational programs is further based on the historical information.

12. The system of claim 10, wherein the one or more computer-readable non-transitory storage media further comprise instructions that, when executed by the one or more processors, further cause the computer server to:
request, from a plurality of users of the education decision-making tool, demographic information and education information, wherein the ROI assessment for one of the plurality of educational programs is further based on the demographic information and the education information.

13. The system of claim 10, wherein the first user input corresponding to the input of profile information and the educational goals information for the potential student is based on a personalized set of information associated with a unique identifier for the potential student.

14. The system of claim 10, wherein the instructions to select the set of one or more educational programs further comprises instructions to:
rank the plurality of educational programs based on the respective ROI assessments.

15. The system of claim 10, wherein an ROI assessment is computed for each of a plurality of potential students, and wherein the one or more computer-readable non-transitory storage media further comprise instructions that, when executed by the one or more processors, further cause the computer server to:
generate a ranked list of the plurality of potential students based on their respective ROI assessments; and
provide the ranked list to the client computing device.

16. The system of claim 10, wherein the second user input is determined based on a user interaction with the one or more interactive elements.

17. The system of claim 10, wherein, prior to determining the second user input, the corresponding weights for each of the one or more preference factors are based on general criteria; and
after determining the second user input, the corresponding weights for each of the one or more preference factors are based on criteria customized for a user of the education decision-making tool.

18. The system of claim 10, wherein, in response to determining the user interaction with the one or more interactive elements displayed within the user interface, the one or more computer-readable non-transitory storage media further comprise instructions that, when executed by the one or more processors, further cause the computer server to:
generate a shareable resource uniquely representative of the second information set; and
cause the user interface executing on the client computing device to display the second information set and the shareable resource concurrently.

19. A non-transitory computer-readable medium comprising instructions that, when executed by one or more processors of a computing server, cause the one or more processors to:
determine a first user input inputted via a user interface serviced by the computer server and executing on a client computing device coupled to the computer server via a communications network, the first user input corresponding to an input of profile information, one or more preference factors, and educational goals information for a potential student;
compute, for each of a plurality of educational programs, a cost-benefit assessment for the user based on the profile information and the educational goals information;
compute, for each of the plurality of educational programs, a return-on-investment (ROI) assessment for the user based on the educational goals information, the one or more preference factors weighted based on a corresponding weight for each of the one or more preference factors, and the cost-benefit assessment;
select a set of one or more educational programs of the plurality of educational programs based on the respective ROI assessments;
cause the user interface executing on the client computing device to display a first information set including first information corresponding to the selected set of one or more educational programs;
determine a second user input inputted via the user interface executing on the client computing device, the second user input comprising an input to modify at least one of the corresponding weights that the one or more preference factors is weighted based on;
re-compute the ROI assessments for the user for each of the plurality of educational programs based on the educational goals information, the one or more preference factors weighted based on at least one modified weight for each of the one or more preference factors, and the cost-benefit assessment;
select a different set of one or more educational programs of the plurality of educational programs based on the respective re-computed ROI assessments; and
in response to determining a user interaction with one or more interactive elements displayed within the user interface and corresponding to the one or more educational programs:
cause the user interface executing on the client computing device to display a second information set regarding the different set of one or more educational programs, wherein the second information set comprises detailed information about the one or more educational programs of the different set of one or more educational programs, wherein the detailed information is included in the second information set based on the second user input, and wherein causing the user interface executing on the client computing device to display the second information set comprises dynamically updating the user interface to display second information corresponding to the different set of one or more educational programs visually more prominently than the displayed first information corresponding to the selected set of one or more educational programs.

20. The non-transitory computer-readable medium of claim 19, further comprising instructions that, when executed by the one or more processors of the computer server, further cause the one or more processor of the computer server to:
  access a database comprising historical information for a plurality of students, the historical information comprising demographic information and education information, wherein the ROI assessment for one of the plurality of educational programs is further based on the historical information.

21. The non-transitory computer-readable medium of claim 19, further comprising instructions that, when executed by the one or more processors of the computer server, further cause the one or more processor of the computer server to:
  request, from a plurality of users of the education decision-making tool, demographic information and education information, wherein the ROI assessment for one of the plurality of educational programs is further based on the demographic information and the education information.

22. The non-transitory computer-readable medium of claim 19, wherein the first user input corresponding to the input of profile information and the educational goals information for the potential student is based on a personalized set of information associated with a unique identifier for the potential student.

23. The non-transitory computer-readable medium of claim 19, wherein the instructions to select the set of one or more educational programs further comprises instructions to:
  rank the plurality of educational programs based on the respective ROI assessments.

24. The non-transitory computer-readable medium of claim 19, wherein an ROI assessment is computed for each of a plurality of potential students, and further comprising instructions that, when executed by the one or more processors of the computer server, further cause the one or more processor of the computer server to:
  generate a ranked list of the plurality of potential students based on their respective ROI assessments; and
  provide the ranked list to the client computing device.

25. The non-transitory computer-readable medium of claim 19, wherein the second user input is determined based on a user interaction with the one or more interactive elements.

26. The non-transitory computer-readable medium of claim 19, wherein, prior to determining the second user input, the corresponding weights for each of the one or more preference factors are based on general criteria; and
  after determining the second user input, the corresponding weights for each of the one or more preference factors are based on criteria customized for a user of the education decision-making tool.

27. The non-transitory computer-readable medium of claim 19, wherein, in response to determining the user interaction with the one or more interactive elements displayed within the user interface, further comprising instructions that, when executed by the one or more processors of the computer server, further cause the one or more processor of the computer server to:
  generate a shareable resource uniquely representative of the second information set; and
  cause the user interface executing on the client computing device to display the second information set and the shareable resource concurrently.

* * * * *